United States Patent
Dass et al.

(10) Patent No.: US 6,357,330 B1
(45) Date of Patent: *Mar. 19, 2002

(54) METHOD AND APPARATUS FOR CUTTING A WAFER

(75) Inventors: M. Lawrence A. Dass, Fremont; Isaura S. Gaeta, Sunnyvale; Krishna Seshan, San Jose, all of CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,493

(22) Filed: Jan. 7, 1999

(51) Int. Cl.[7] .............................. B23D 5/30; B26D 11/00
(52) U.S. Cl. .............................. 83/863; 83/73; 83/76.1; 83/169; 83/367; 83/368; 83/370; 125/13.01
(58) Field of Search .................. 83/39, 49, 63, 83/73, 76, 76.1, 169, 170, 862, 863, 875, 876, 882, 886, 887, 360, 367, 368, 370, 371, 477; 125/13.01, 20, 12

(56) References Cited

U.S. PATENT DOCUMENTS

| | | | | |
|---|---|---|---|---|
| 4,328,553 A | * | 5/1982 | Fredriksen et al. | 364/559 |
| 4,614,430 A | * | 9/1986 | Hara et al. | 356/394 |
| 4,688,540 A | * | 8/1987 | Ono | 125/13.01 |
| 4,705,016 A | * | 11/1987 | Sekiya | 125/13.01 |
| 4,794,736 A | * | 1/1989 | Fuwa et al. | 125/13.01 X |
| 4,932,781 A | * | 6/1990 | Kuwayama | 356/357 |
| 5,433,649 A | * | 7/1995 | Nishida | 83/62 X |
| 5,450,203 A | * | 9/1995 | Penkethman | 356/373 |
| 5,501,104 A | * | 3/1996 | Ikeda et al. | 73/629 |
| 5,628,673 A | * | 5/1997 | Morooka | 125/13.01 X |
| 5,718,615 A | * | 2/1998 | Boucher et al. | 83/62 X |
| 5,786,266 A | * | 7/1998 | Boruta | 83/861 X |
| 5,839,335 A | * | 11/1998 | Tilley | 83/169 |
| 5,842,461 A | * | 12/1998 | Azuma | 125/13.01 |
| 6,006,739 A | * | 12/1999 | Akram et al. | 83/864 X |
| 6,074,287 A | * | 6/2000 | Miyaji et al. | 451/287 |

* cited by examiner

*Primary Examiner*—M. Rachuba
(74) *Attorney, Agent, or Firm*—Blakely, Sokoloff, Taylor & Zafman LLP (57) ABSTRACT

A wafer cutting apparatus which includes a wafer saw, a detector, and a control unit. The detector detects a variable of a wafer being sawed. The control unit utilizes the variable to control the saw.

12 Claims, 9 Drawing Sheets

METHOD AND APPARATUS FOR CUTTING A WAFER

BACKGROUND OF THE INVENTION

1). Field of the Invention

This invention generally relates to a wafer cutting apparatus and, more specifically, to a wafer cutting apparatus which includes a saw for cutting a wafer wherein the saw is controlled by a variable of the wafer.

2). Discussion of Related Art

Figure 1:
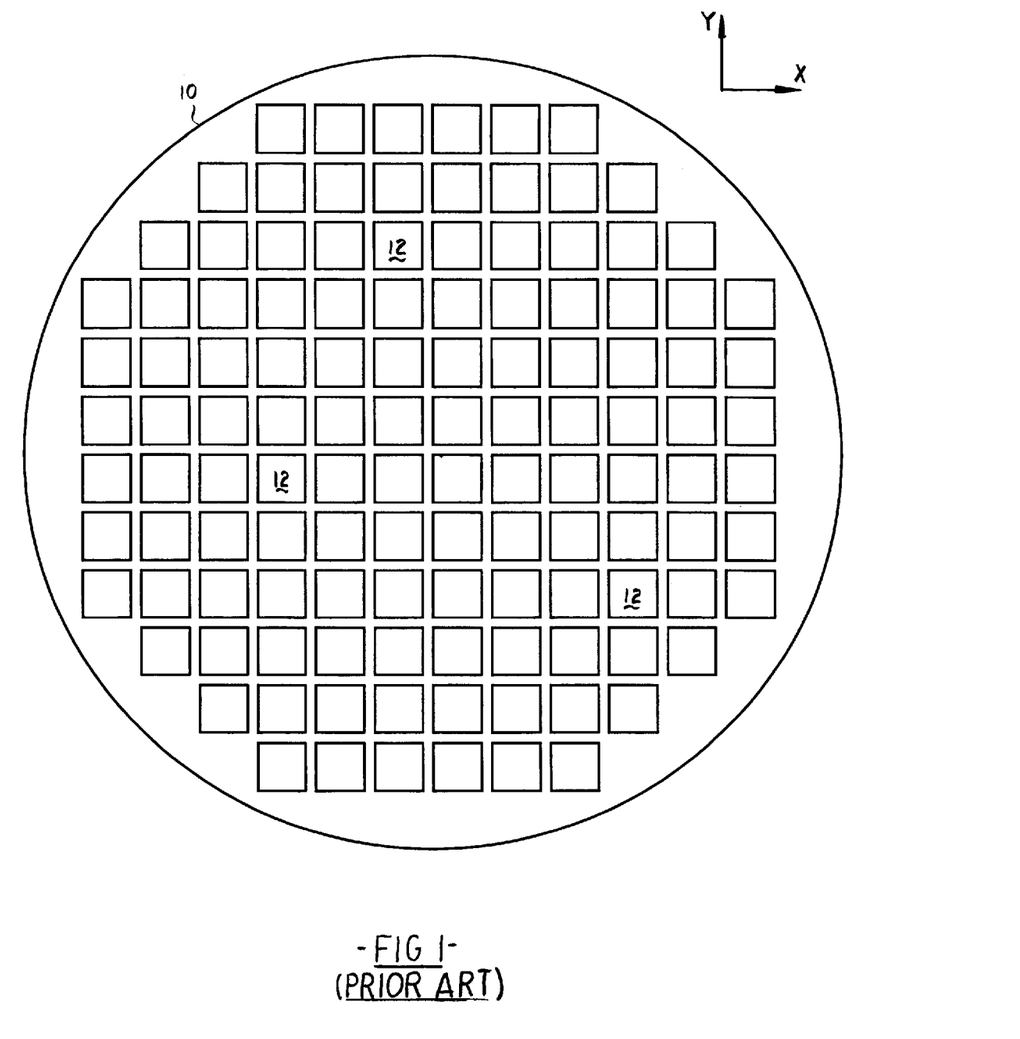
FIG. 1 is a top plan view of a conventional wafer.

FIG. 1 illustrates a conventional silicon wafer 10. The manufacture of semiconductor chips involves the formation of a number of integrated circuits 12 on such a silicon wafer 10. The integrated circuits 12 are usually positioned in a matrix of rows and columns. The integrated circuits 12 are then severed from one another in a subsequent sawing operation.

Figure 2A:
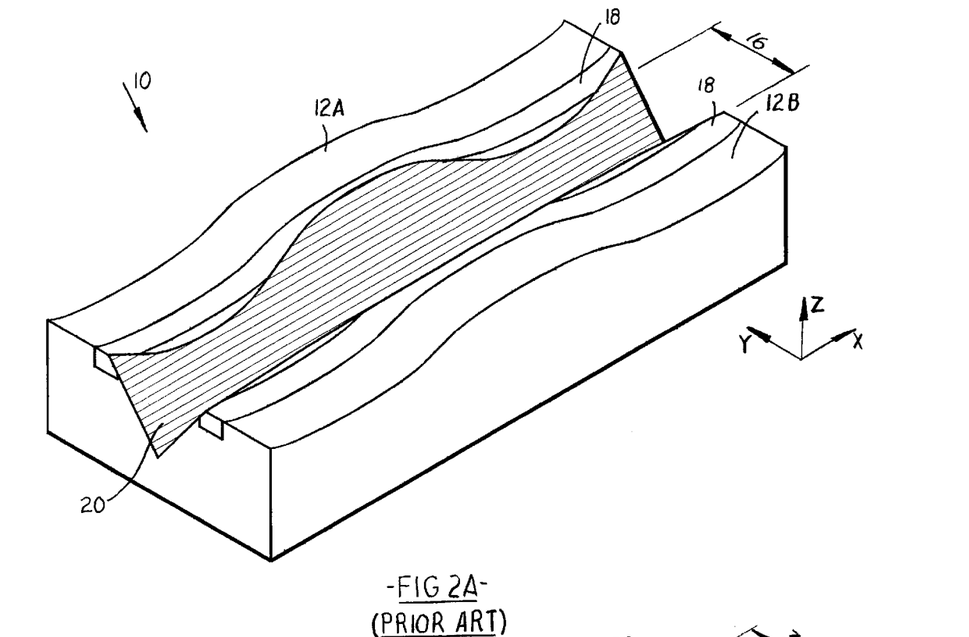
FIG. 2A is perspective view of a wafer having an undulating upper surface with a saw street in which a V-shaped groove is cut according to a prior art method.

FIG. 2A illustrates a portion of a wafer of the above kind having adjacent integrated circuits 12A and 12B with a saw street 16 defined between the integrated circuits 12A and 12B. A guard ring 18 is made around each integrated circuit 12A and 12B. The guard rings 18 form edges of the saw street 16.

The wafer 10 has an undulating upper surface which may be due to the manufacturing of the integrated circuits 12A and 12B or due to mounting of the wafer 10 for purposes of sawing. A V-shaped groove 20 is sawed through the saw street 16. A sawing blade (not shown) having a V-shaped edge is used for sawing the groove 20. The sawing blade is progressed through the saw street 16 without compensating for differences in height of the wafer 10 so that the width of the groove 20 varies along its length. Variations in width of the groove 20 may cause severe damage to the guard ring 18 and the integrated circuits 12.

Figure 2B:
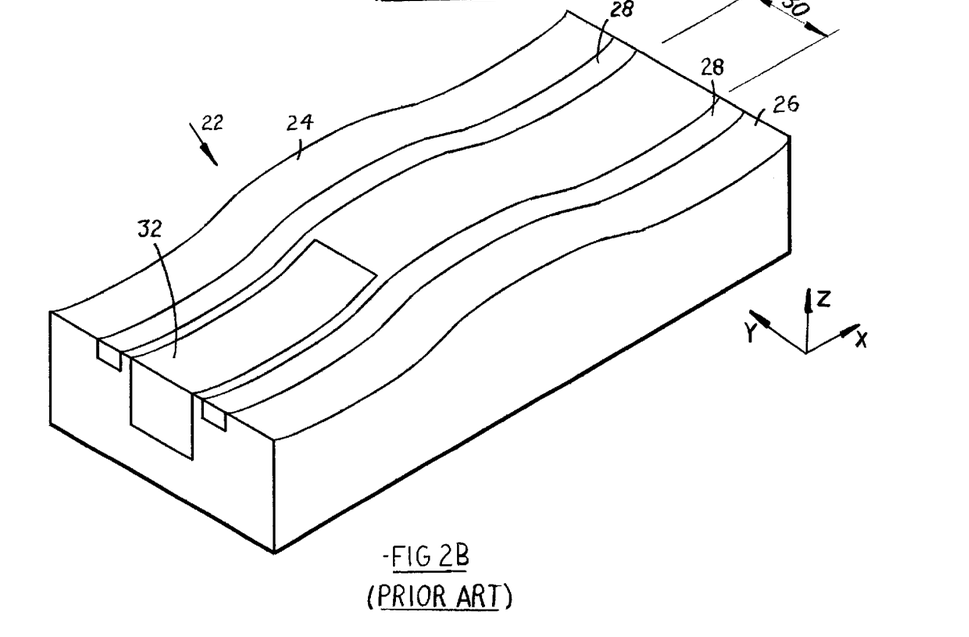
FIG. 2B is a perspective view of a wafer having a saw street in which an object or objects are located.

FIG. 2B illustrates a portion of a wafer 22 with portions of integrated circuits 24 and 26, guard rings 28, and a saw street 30 as in FIG. 2A. The saw street is made of silicon and one or more objects 32 of a different material than silicon is located in the saw street 30. The objects 32 are typically made of aluminum, aluminum-copper, tungsten or copper. The objects 32 may include test features such as thickness monitors, resistance monitors, device monitors, fabrication alignment marks etc.

A sawing blade may progress through the silicon saw street 30 without causing major damage to the guard ring 28. However, when the sawing blade starts sawing through the objects 32, major damage to the guard ring 28 and the integrated circuits 12A and 12B may result. Damage to the guard ring 28 and the integrated circuits 12A and 12B is typically in the form of delamination of different layers of the wafer 10 and may be due to a number factors including the material characteristics of the objects 32, the rotational speed of the sawing blade, the speed at which the sawing blade progresses through to the saw street 30, the accumulation of debris, plate quality, past usage of the blade or variations in temperature of the wafer 10 while being cut.

SUMMARY OF THE INVENTION

A wafer cutting apparatus which includes a wafer saw, a detector, and a control unit. The wafer saw includes a wafer holder. The detector detects a variable of a wafer being held by the wafer holder. The control unit utilizes the variable to control the saw.

BRIEF DESCRIPTION OF THE DRAWINGS

The invention is further described by way of examples with reference to the accompanying drawings wherein.

DESCRIPTION OF PREFERRED EMBODIMENT

A wafer cutting apparatus and a method of cutting a wafer are described. In the following description, for purposes of explanation, numerous specific details are set forth in order to provide a thorough understanding of the present invention. It will be evident, however, to one skilled in the art, that the present invention may be practiced without these specific details.

Figure 3:
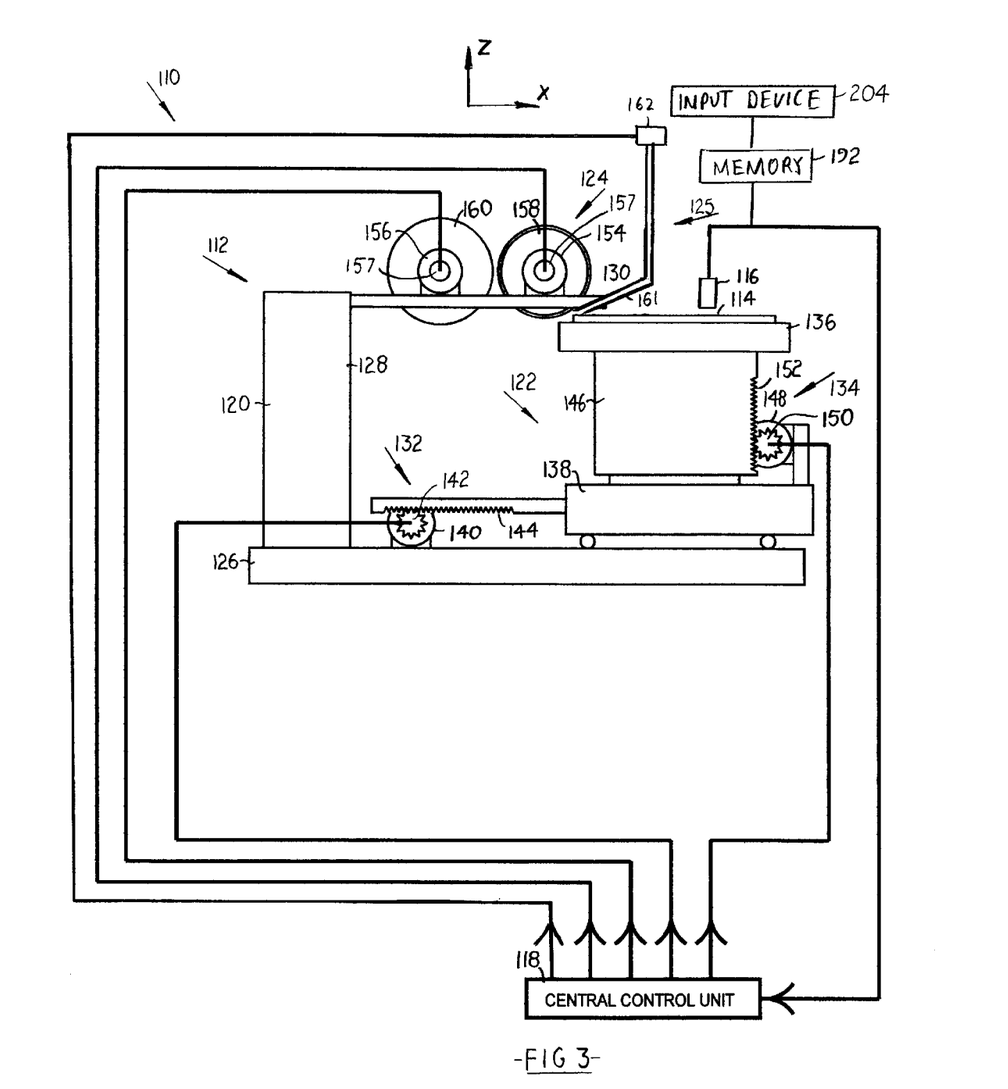
FIG. 3 is a view of a wafer cutting apparatus according to an embodiment of the invention.

FIG. 3 of the accompanying drawings illustrates a wafer cutting apparatus 110 which includes a wafer saw 112 which is used for sawing a wafer 114, a detector 116 which detects a variable of the wafer 114, and a central control unit 118 which utilizes the variable to control the saw 112.

The saw may be of conventional kind and typically includes a stand 120, wafer moving apparatus 122, wafer sawing apparatus 124, and apparatus 125 for removing debris.

The stand 120 includes a base 126, a stable pillar assembly 128 extending upwardly from the base 126, and an overhead support 130 mounted to the pillar assembly 128 and extending over the base 126.

The wafer moving apparatus 122 includes a horizontal translation apparatus 132, a depth adjuster 134 located on the translator 132, and a wafer mounting table 136 located on the depth adjuster 134.

The horizontal translation apparatus 132 includes a wheeled support structure 138 which is horizontally movable over the base 126, a translator motor 140, a pinion 142 which is driven by the translator motor 140, and a rack gear 144 which is driven by the pinion 142 to cause translational movement of the support structure 138 over the base 126.

The depth adjuster 134 includes a lift arm 146 which is mounted for vertical movement to the support structure 128, a depth adjusting motor 148 counted to the support structure 138, a pinion 150 which is driven by the depth adjusting motor 148, and a rack gear 152 which is driven by the pinion 150 to cause vertical movement of the lift arm 146.

A wafer holder table 136 is mounted on the lift arm 146. The wafer 114 may be held in position on the wafer holder table 136 by means of vacuum suction passages (not shown) extending through the wafer holder table 136.

The wafer sawing apparatus 124 includes two motors 154 and 156 mounted to the overhead support 130, each having a spindle 157 to which a respective sawing blade 158 or 160 is mounted.

The apparatus 125 for removing debris includes a nozzle 161 which is positioned to direct fluid onto an area of the wafer 114 in front of the sawing blade 158 and blade 160, and a valve 162 which controls flow through the nozzle 161.

Operation of the translator motor 140 results in the sawing blades 158 and 160 progressing over the wafer 114. By rotating the pinion 142 at different speeds with the translator motor 140, different feed speeds of sawing the wafer 114 can therefore be achieved.

By operating the depth adjusting motor 148, the wafer .114 can be moved towards or away from the sawing blades 158 and 160. By operating the depth adjusting motor 148, the depth of cut during sawing can be therefore adjusted.

By controlling the motors 154 and 156, rotational speeds of the sawing blades 158 and 160 can be varied independently from one another. The sawing blade 160 follows the sawing blade 158 during sawing. The sawing lade 158 is slightly smaller than the sawing blade 160 and has a V-shaped sawing edge which is used for sawing a V-shaped groove in an upper surface of the wafer 114. The sawing blade 160 then saws into the V-shaped groove through the wafer 114.

The wafer 114 may have an undulating upper surface. In order for the sawing blade 158 to form a V-shaped groove of constant width in the upper surface of the wafer 114, it is therefore necessary that the sawing blade 158 follows the contours of the undulating upper surface.

The wafer 114 may, alternatively or in addition, have a saw street of silicon in which other objects such as aluminum, aluminum-copper, tungsten, copper or other metal and other objects are located. In order to prevent major damage to the wafer 114 in an area next to these objects, it may be necessary to adjust the speed of rotation of the sawing blades 158 or 160, to adjust the depth of cut into the wafer 114, or to adjust the feed speed during sawing.

The detector 116 may be positioned to detect one or more variables of the wafer 114, including the variations in height of an upper surface of the wafer 114, and the presence of objects in a street of sawing.

Figure 4:
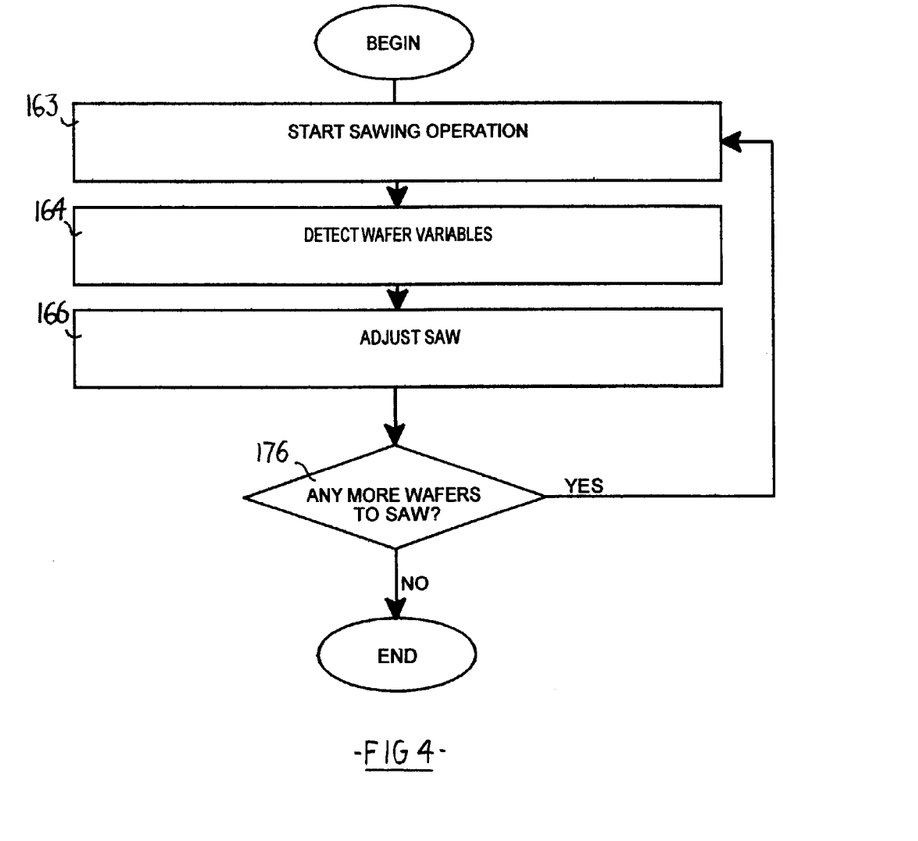
FIG. 4 is a flow chart illustrating one method of operating the apparatus of FIG. 3 for purposes of cutting a wafer, wherein wafer variables are detected.

The central control unit 118 is connected to the detector 116. The central control unit 118 may be of conventional kind and is typically a personal computer including memory in which a program may be loaded for execution of the method of the invention. The translator motor 140, the depth adjusting motor 148, both the motors 154 and 156 which rotate the sawing blades 158 and 160, and the valve 162 are connected to the central control unit 118. The central control unit 118 utilizes the variables detected by the detector 116 to control the motors 140, 148, 154 and 156. FIG. 4 illustrates one method of operating the apparatus 110 of FIG. 3.

In step 163 the sawing operation is started, i.e. the motors 154 and 156 are turned on, and the translator motor 140 rotates the pinion 142.

In step 164 one or more wafer characteristics are detected utilizing the detector 116.

In step 166 the central control unit 118 responds to the variable which is detected to adjust the saw 112.

For example, the detector 116 may detect variations in height of an upper surface of the wafer 114. The central control unit 118 then operates the depth adjusting motor 148 so that the height of the wafer 114 is continuously adjusted so that the sawing blade 158 follows the contours of the surface of the wafer 114. The sawing blade 158 is typically adjusted to compensate for variation in height of the wafer 114 of between about 2 mils and about 3 mils In another example, the detector 116 may detect the presence of objects within a street of sawing. The central control unit then responds to the detection of the objects to control one or more of the motors 140, 148, 154 or 156. The central control unit 118 may, for example, reduce the rotation speed of the sawing blades 158 or 160 in order to prevent damage to the wafer 114 in an area of the objects. The rotation speeds of the blades 158 or 160 are typically between about 40,000 rpm and 50,000 rpm when cutting through silicon and between about 20,000 rpm and 30,000 rpm when cutting though metal objects. Other characteristics or features of the wafer may also be determinative in adjusting the rotation speeds of the blades. The presence of a polyimide layer may, for example, require rotational speeds of between about 30,000 rpm and 40,000 rpm. The central control unit 118 may, in addition or alternatively, reduce the speed of rotation of the translator motor 140 to reduce the feed speed during sawing. The feed speed is typically varied from about 1 inch per econd to about 6 inches per second, with low speeds used for cutting through metal objects and high speeds used for cutting through silicon. Alternatively or in addition, the central control unit 118 may operate the depth adjusting motor 148 so as to reduce the depth of cut of the sawing blade 158 or 160.

Alternatively or in addition, flow through the nozzle 161 may be controlled by controlling the valve 162. For example, the detector 116 may be an infrared detector which detects the temperature of the wafer 114, and the central control unit 118 may control the nozzle 162 in response to detection of the temperature of the wafer 114. As an example, the rate of flow of fluid through the nozzle 161 may be increased in order to cool a portion of the wafer. Alternatively, the particular fluid flowing through the nozzle 161 may be altered by controlling the valve 162. For example, air or nitrogen may flow through the nozzle 161 for purposes of removing debris while the wafer 114 is below a particular threshold temperature. Once the temperature of the wafer increases above the threshold temperature, the fluid flowing through the nozzle may be switched, by the nozzle 162, to, for example, water or another fluid having better thermal conductivity characteristics or better lubricating properties.

Figure 5:
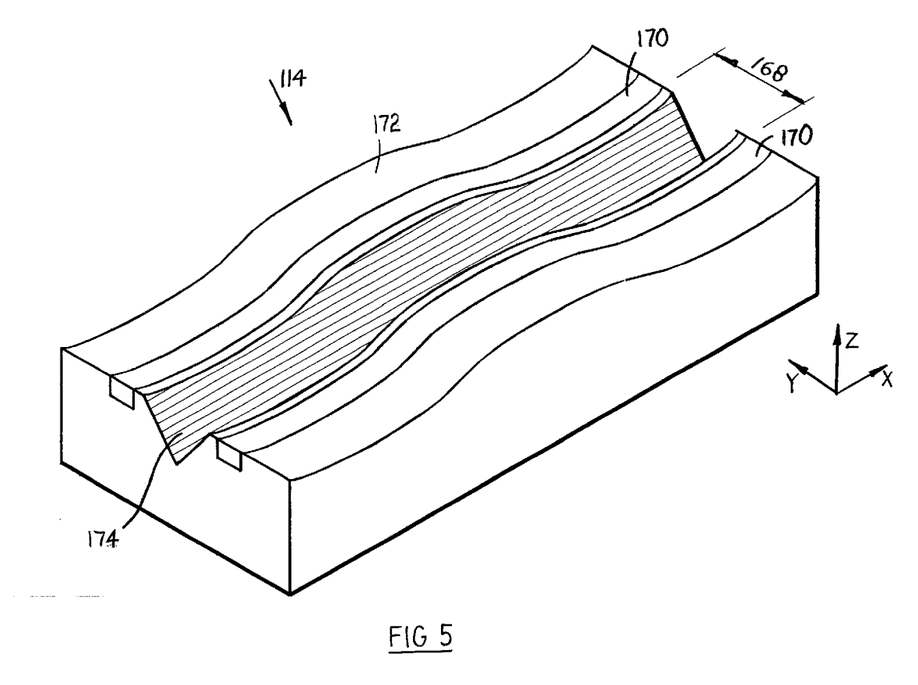
FIG. 5 is a view similar to FIG. 1 of a wafer having an undulating upper surface with a saw street in which a V-shaped groove is sawed utilizing the apparatus of FIG. 3.

In the case where the detector detects variations in height of an upper surface of the wafer, the sawing blade 158 may cut a groove as shown in FIG. 5. FIG. 5 shows a portion of the wafer 114 having a saw street 168 with guard ring boundaries 170 on either side. An upper surface 172 of the wafer 114 is undulated. The sawing blade 158 cuts a V-shaped groove 174 between the guard ring boundaries 170. The V-shaped groove 174 follows the contours of the upper surface 172. The resulting V-shaped groove 174 is of substantially constant width and therefore does not encroach onto the guard ring boundaries 170. Damage to the guard ring boundaries 170 and the area surrounding the guard ring boundaries 170 is thereby avoided.

Referring again to FIG. 4, in step 176 an operator decides whether there are any more wafers to be sawed. Any further wafers can then be sawed following the steps 163, 164 and 166 outlined above.

The detector may be any device which is known in the art such as an air jet responder for detecting height, a capacitance probe or a lazer detector for detecting height or the presence of objects, or both height and the presence of objects, or an infrared detector for detecting temperature.

Figure 6:
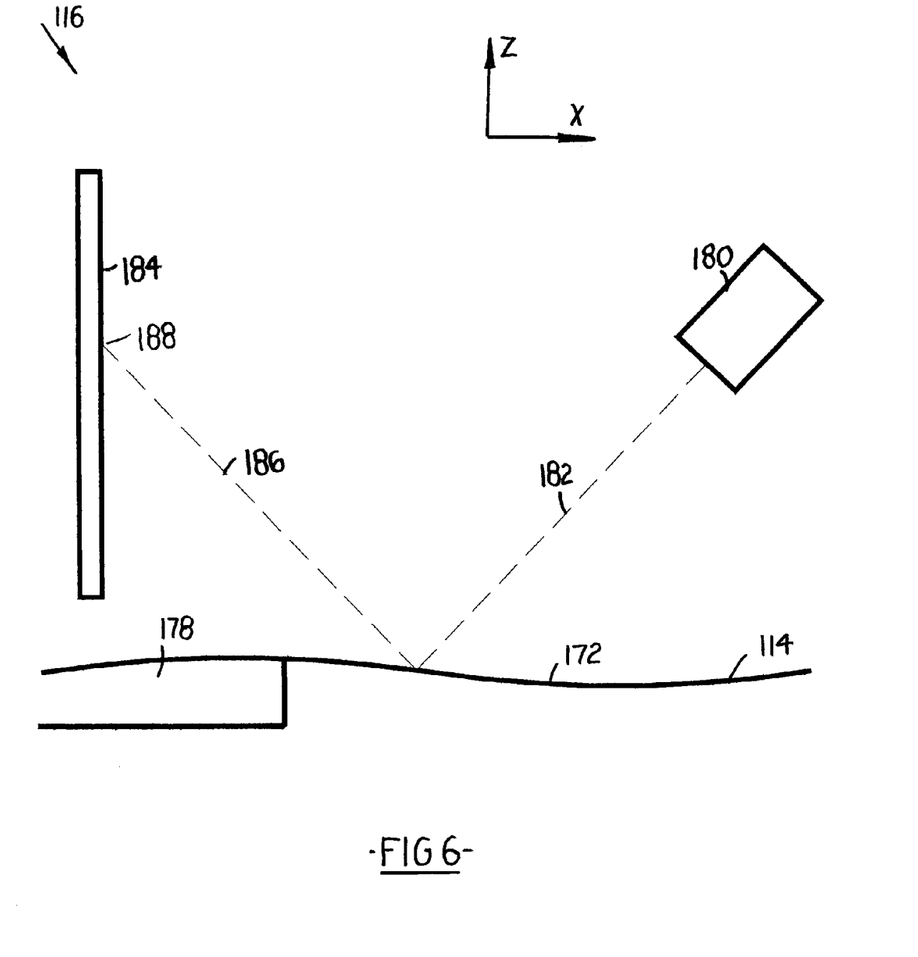
FIG. 6 is a side view illustrating a detector which may be used in the embodiment of FIG. 3.

FIG. 6 illustrates one detector 116 which may be used for detecting both the undulating upper surface 172 of the wafer 114 and the presence of objects 178 in the saw street 168 of the wafer 114. The wafer 114 may be made of silicon and therefore have low reflective characteristics. The objects 178 may be metal objects having high reflective characteristics.

The detector 116 may be of the kind which is conventional in the art and may include a laser source 180 which directs a laser beam 182 onto the upper surface 172, and a detecting surface 184 on which reflected portion 186 of the laser beam 182 shines. A light spot 188 is so created on the surface 184.

Movement of the undulating upper surface 172 towards and away from the detector 116 causes up and down movement of the spot 188 on the surface 184. The movement of the spot 188 is therefore indicative of an undulations in the upper surface 172.

The laser beam 182 reflects less off the silicon portion of the wafer 114 than off the metal objects 178. The reflected portion 186 is therefore more intense when the laser beam 182 shines on the metal objects 178, resulting in an increase in intensity of the spot 188. The intensity of the spot 188 can so be used to detect the metal objects 178.

Referring again to FIG. 3, a memory 192 may be coupled to the detector 116 and to the central control unit 118. The memory 192 typically forms part of the central control unit 118, which, as mentioned, may be a personal computer.

Figure 7:
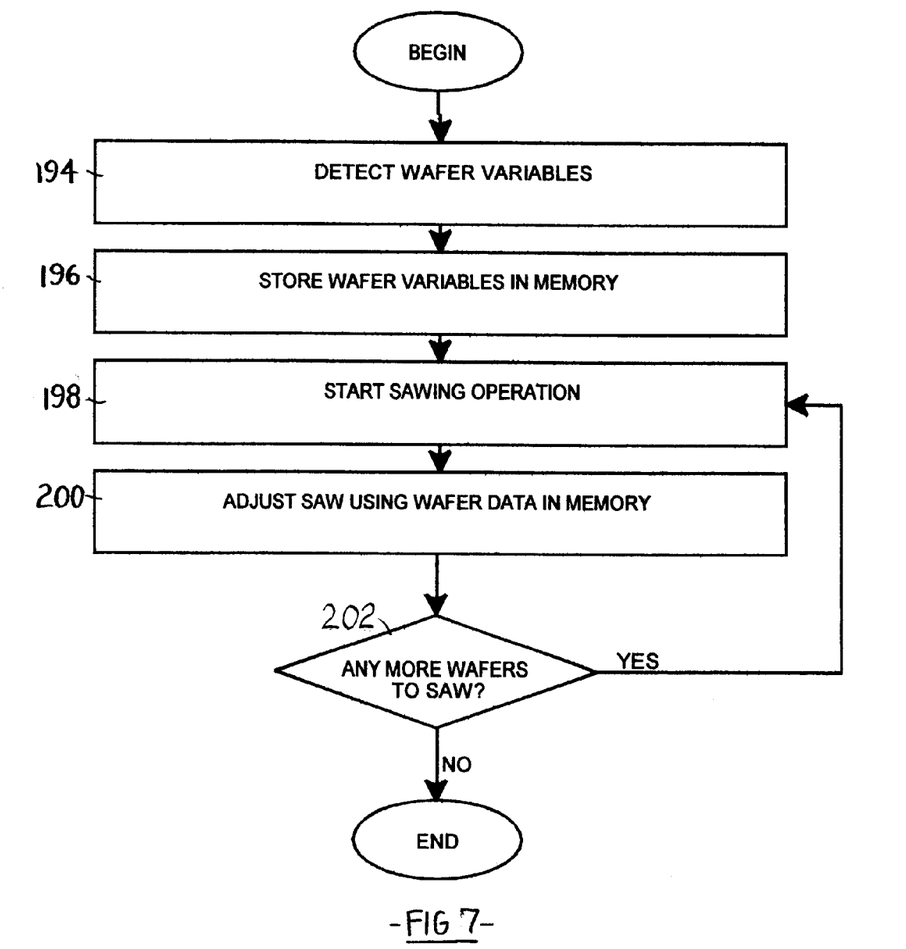
FIG. 7 is a flow chart illustrating another method of operating the apparatus of FIG. 3, wherein wafer variables are stored in memory.

FIG. 7 illustrates the operation of the wafer cutting apparatus 110 utilizing the memory 192.

In step 194 the translator motor 140 is operated so that the detector moves over the wafer 114 and detects variables of the wafer 114.

In step 196 the variables are stored in the memory 192. Steps 194 and 196 may be repeated for two or more saw streets of the wafer so that variables of two or more of the saw streets are stored in memory.

In step 198 the sawing operation of the wafer 114 is started.

In step 200 the saw 112 is adjusted by the central control unit 118 with the central control unit 118 utilizing the wafer data in the memory 192.

In step 202 an operator decides whether there are any further wafers to be sawed. If there is another wafer to be sawed, the sawing operation again begins with the central control unit 118 using the same data that was stored in the memory 192 for the first wafer. A plurality of wafers having similar variables can so be sawed utilizing the same data stored in the memory 192.

Referring again to FIG. 3, an input device 204 may be coupled to the memory 192. The input device 204 may be a keyboard which may form part of the central control unit 118.

Figure 8:
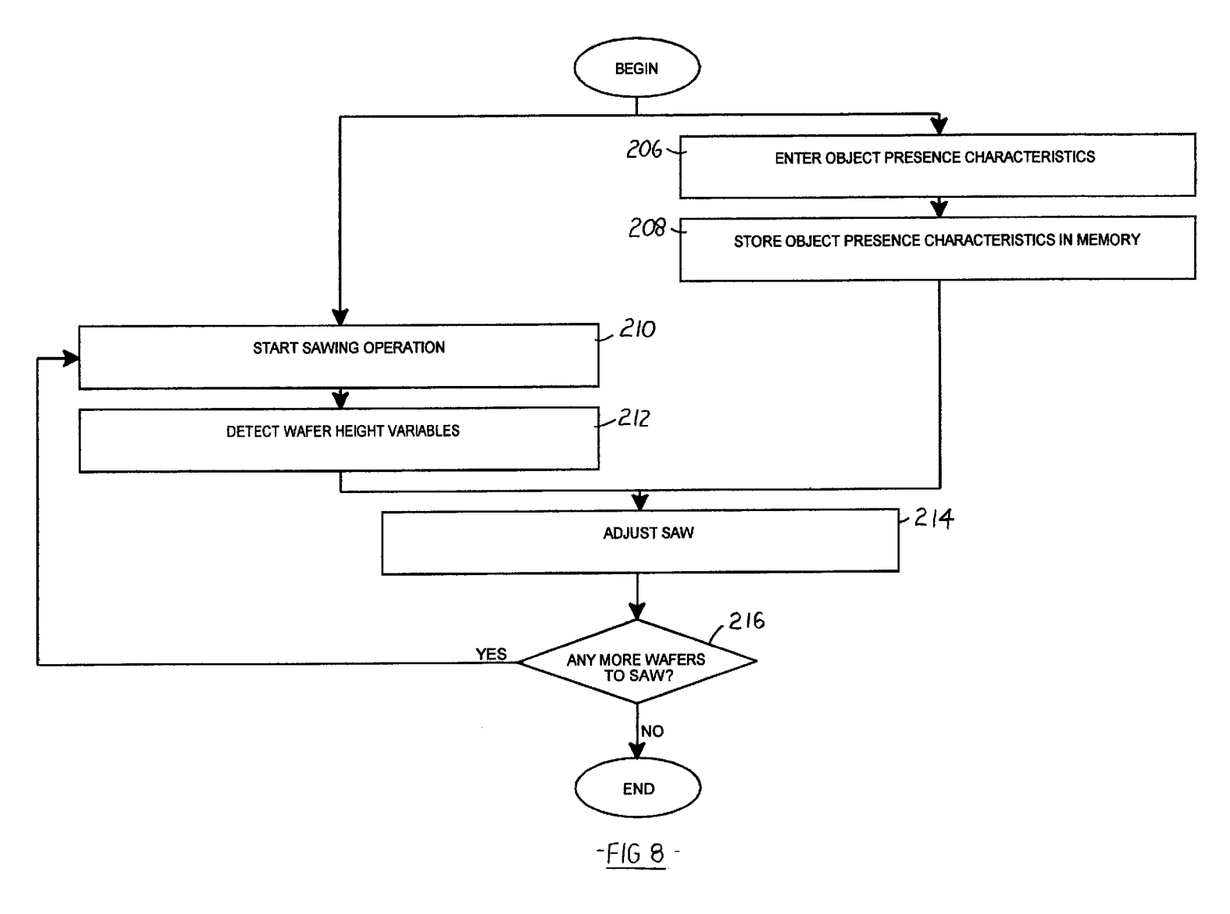
FIG. 8 is a flow chart illustrating a further method of operating the apparatus of FIG. 3, wherein wafer characteristics are manually entered and wafer variables are detected.

FIG. 8 illustrates the use of the input device 204 in combination with the method as hereinbefore described with reference to FIG. 4.

In step 206 an operator utilizes the input device 204 to enter certain wafer characteristics such as object presence data in a street of sawing.

In step 208 the object presence characteristics are stored in the memory 192.

In step 210 the sawing operation of the wafer 114 is started.

In step 212 the detector 116 detects a variable or variables of the wafer such as variations in height of the wafer.

In step 214 the central control unit 118 utilizes both the variations in height variables detected with the detector 116 and the object presence characteristics stored in the memory 192 to adjust the saw. Adjustment of the saw is in response to the detection of the height variables of the wafer 114.

In step 216 an operator decides if there are any further wafers to be sawed. If there is another wafer to be sawed then the sawing operation is again started with the detector 116 detecting the height variables of the new wafer. Successive wafers can so be sawed by detecting the height variables of each wafer individually and using the same object presence characteristics stored in the memory 192 for all the wafers.

Figure 9:
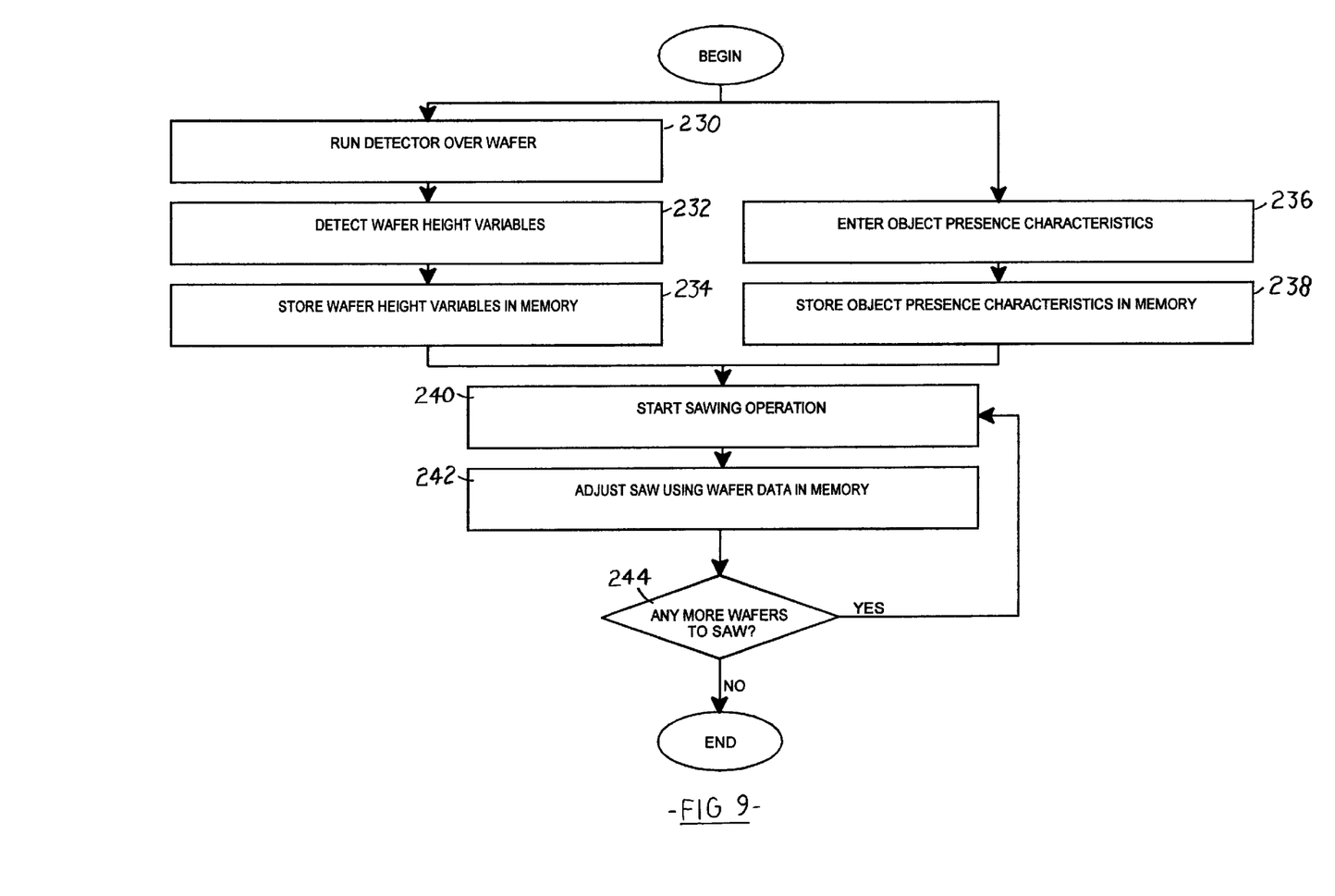
FIG. 9 is a flow chart illustrating yet a further method of operating the apparatus of FIG. 9, wherein wafer characteristics are manually entered and wafer variables are detected and stored in memory.

FIG. 9 illustrates the use of the input device 204 in combination with the method as hereinbefore described with reference FIG. 7.

In step 230 the translator motor 140 is operated so that the detector is run over the wafer 114.

In step 232 the detector detects certain wafer variables such as variations in height of the wafer.

In step 234 the wafer height variables are stored in the memory 192.

In step 236 an operator utilizes the input device 204 to enter certain wafer characteristics such as object presence characteristics.

In step 238 the object presence characteristics are stored in the memory 192.

In step 240 the sawing operation of the wafer 114 is started.

In step 242 the central control unit 118 utilizes the wafer height variables stored in the memory 192 and the object presence characteristics stored in the memory 192 to adjust the saw 112.

In step 244 the operator decides whether there are any more wafers to be sawed. If there is another wafer to be sawed then the sawing operation is again started with the central control unit 118 again utilizing the same wafer height variables stored in the memory 192 from the first wafer, and the same object presence characteristics stored in the memory 192 to adjust the saw 112. Successive wafers can so be sawed with the central control unit 118 using the original wafer height variables and object presence characteristics stored in the memory 192.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed:

1. An apparatus for cutting a wafer which includes:
   a wafer saw including a stand, a wafer holder on the stand capable of holding a wafer, and a spindle on the stand to which a sawing blade is mountable to saw the wafer, the spindle and the wafer holder being movable relative to one another to saw the wafer in a selected direction;
   a detector mounted so as to face a surface of the wafer, the detector detecting a feature at a surface of a wafer when held by the wafer holder, the detector and the wafer holder being movable relative to one another in the selected direction to allow the detector to detect variability of the feature along the surface of the wafer in the selected direction; and a control unit which utilizes the variable to vary sawing of the wafer by the blade in the selected direction as a function of variability in the selected direction.

2. The wafer cutting apparatus of claim 1 wherein the saw includes:

a depth adjuster which is operable to move the spindle and the wafer holder relative to one another so as to adjust the depth of cut of the wafer, wherein the feature is a height of the wafer and the control unit controls the depth adjuster.

3. The wafer cutting apparatus of claim 1 wherein the saw includes:

a motor which is operable to rotate the spindle, wherein the feature depends on a material of the wafer and the control unit controls the speed of rotation of the motor.

4. The wafer cutting apparatus of claim 1 wherein the saw includes:

translation apparatus which is operable to move the wafer holder and the spindle relative to one another so as to progress the blade over the wafer, wherein the feature depends on a material of the wafer and the control unit controls the translator.

5. The wafer cutting apparatus of claim 1 wherein the saw includes:

a nozzle positioned to direct flow of a fluid onto the wafer being sawed, wherein the control unit controls the flow through the nozzle dependent on the feature.

6. The wafer cutting apparatus of claim 1 wherein the feature provides information about variations in height of the wafer.

7. The wafer cutting apparatus of claim 1 wherein the presence of objects in a street of sawing, the feature being one of the objects.

8. The wafer cutting apparatus of claim 1 wherein the feature is a temperature of the wafer.

9. The wafer cutting apparatus of claim 1 wherein the control of the sawing of the wafer by the blade by the control unit is in response to the detector detecting the wafer.

10. The wafer cutting apparatus of claim 1 which includes a memory coupled to the detector for storing the variable of the feature, wherein the control unit utilizes the variable stored in memory to control sawing of the wafer.

11. The wafer cutting apparatus of claim 10 which includes a data entering device for storing a wafer characteristic in the memory, wherein the control unit utilizes the wafer characteristic to control sawing of the wafer.

12. The wafer cutting apparatus of claim 1 which includes a memory and a data entering device coupled to the memory for entering a wafer characteristic into the memory, wherein the control unit utilizes the wafer characteristic to control sawing of the wafer.

* * * * *

UNITED STATES PATENT AND TRADEMARK OFFICE
CERTIFICATE OF CORRECTION

PATENT NO.   : 6,357,330 B1  
DATED        : March 19, 2002  
INVENTOR(S)  : Dass et al.

It is certified that error appears in the above-identified patent and that said Letters Patent is hereby corrected as shown below:

<u>Column 4,</u>
Line 27, delete "econd", insert -- second --.

Signed and Sealed this

Sixth Day of August, 2002

Attest:

Attesting Officer

JAMES E. ROGAN
*Director of the United States Patent and Trademark Office*